(12) United States Patent
Dhayagude et al.

(10) Patent No.: US 11,496,335 B2
(45) Date of Patent: Nov. 8, 2022

(54) DYNAMICALLY ADDRESSABLE DAISY-CHAINED SERIAL COMMUNICATION WITH CONFIGURABLE PHYSICAL LAYER INTERFACES

(71) Applicant: Dominant Technologies (Singapore) Pte Ltd, Melaka (MY)

(72) Inventors: Tushar Dhayagude, Cupertino, CA (US); EunGu Kim, Campbell, CA (US); Tan Eng Wah, Melaka (MY); Chow Kim Poh, Melaka (MY)

(73) Assignee: DOMINANT TECHNOLOGIES (SINGAPORE) PTE LTD, Melaka (MY)

( * ) Notice: Subject to any disclaimer, the term of this patent is extended or adjusted under 35 U.S.C. 154(b) by 97 days.

(21) Appl. No.: 17/073,069

(22) Filed: Oct. 16, 2020

(65) Prior Publication Data
US 2022/0123959 A1    Apr. 21, 2022

(51) Int. Cl.
*H04L 12/40* (2006.01)
*H04L 25/02* (2006.01)
(Continued)

(52) U.S. Cl.
CPC .... *H04L 12/40136* (2013.01); *G05B 19/0423* (2013.01); *G06F 1/189* (2013.01);
(Continued)

(58) Field of Classification Search
CPC .......... H04L 12/40136; H04L 25/0272; H04L 2012/40215; G05B 19/0423; G06F 1/189; G06F 11/3027; G06F 21/85
See application file for complete search history.

(56) References Cited

U.S. PATENT DOCUMENTS 10,548,203 B2    1/2020   Neumann

FOREIGN PATENT DOCUMENTS

CN        2676153 Y  *  2/2005  ............... G01D 1/00
CN      101887751 A  * 11/2010  ......... G11C 13/0004
(Continued)

*Primary Examiner* — Henry Tsai
*Assistant Examiner* — John B Roche
(74) *Attorney, Agent, or Firm* — Amin, Turocy & Watson, LLP

(57) ABSTRACT

Facilitating ad hoc daisy-chaining of dynamically addressable devices having configurable physical layer interfaces together in a serial manner is presented herein. A system can include a group of devices communicatively coupled with respective devices of the group of devices in a daisy-chained manner via physical layer (PHY) interfaces of the respective devices including a group of available communication protocol configurations including a low voltage differential signaling (LVDS) based PHY configuration, a controller area network (CAN) based PHY configuration, and/or a single-ended serial communication PHY configuration including a complementary metal-oxide-semiconductor (CMOS) based interface or a transistor-transistor logic (TTL) based interface. Further, a host device of the system is directly connected, using a single-ended Manchester encoded serial communication interface, to a foremost device of the group of devices and to successive devices of the respective devices, via the foremost device, using the single-ended Manchester encoded serial communication interface.

20 Claims, 18 Drawing Sheets

(51) Int. Cl.
*G06F 1/18* (2006.01)
*G06F 21/85* (2013.01)
*G05B 19/042* (2006.01)
*G06F 11/30* (2006.01)

(52) U.S. Cl.
CPC .......... *G06F 11/3027* (2013.01); *G06F 21/85* (2013.01); *H04L 25/0272* (2013.01); *H04L 2012/40215* (2013.01)

(56) References Cited

FOREIGN PATENT DOCUMENTS

DE 202016008325 U1 7/2017
WO WO9008501 A1 * 8/1990 ............... A61B 5/00

* cited by examiner

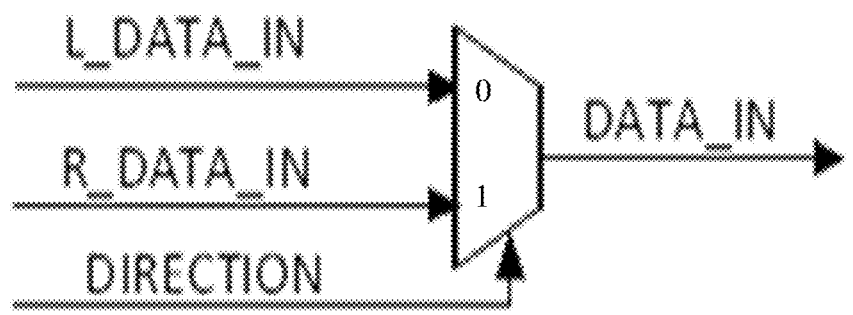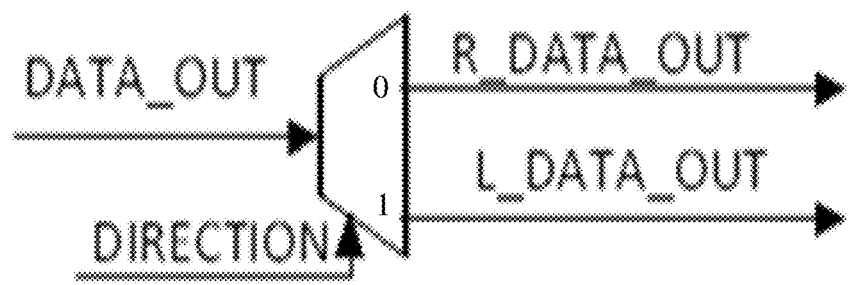
FIG. 6

| PAYLOAD SIZE (PSI) | # of Bytes for Parameters |
|---|---|
| 3'b000 | No parameter |
| 3'b001 | 1 byte parameter |
| 3'b010 | 2 byte parameter |
| 3'b011 | 3 byte parameter |
| 3'b100 | 4 byte parameter |
| 3'b101 | 5 byte parameter |
| 3'b110 | 6 byte parameter |
| 3'b111 | 8 byte parameter |

1700

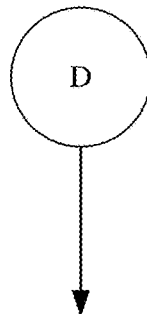

1710 — IN RESPONSE TO RECEIVING, BY THE DEVICE VIA AN UPSTREAM PHY INTERFACE OF THE PHY INTERFACES OF THE DEVICE, AN INITIAL MESSAGE FRAME COMMAND COMPRISING AN INITIALIZATION COMMAND THAT DESIGNATES A DISTINCT DEVICE ADDRESS TO BE ASSIGNED TO A DEVICE ADDRESS OF THE DEVICE, ASSIGN, BY THE DEVICE, THE DISTINCT DEVICE ADDRESS TO THE DEVICE ADDRESS OF THE DEVICE, INCREMENT, BY THE DEVICE, THE DISTINCT DEVICE ADDRESS TO OBTAIN A DOWNSTREAM DEVICE ADDRESS, GENERATE, BY THE DEVICE, A MESSAGE FRAME COMMAND COMPRISING A GENERATED INITIALIZATION COMMAND COMPRISING THE DOWNSTREAM DEVICE ADDRESS, AND SEND, BY THE DEVICE VIA A DOWNSTREAM PHY INTERFACE OF THE PHY INTERFACES OF THE DEVICE COMMUNICATIVELY COUPLING THE DEVICE TO A DOWNSTREAM DEVICE OF THE GROUP OF DEVICES THAT IS IMMEDIATELY DOWNSTREAM OF THE DEVICE, THE GENERATED INITIALIZATION COMMAND TO THE DOWNSTREAM DEVICE

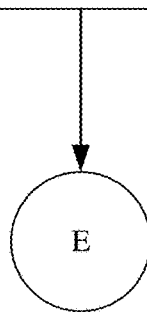

FIG. 17

DYNAMICALLY ADDRESSABLE DAISY-CHAINED SERIAL COMMUNICATION WITH CONFIGURABLE PHYSICAL LAYER INTERFACES

TECHNICAL FIELD

The subject disclosure generally relates to embodiments for a dynamically addressable daisy-chained serial communication with configurable physical layer interfaces.

BACKGROUND

Conventional automotive communication protocols, e.g., local interconnect network (LIN), controller area network (CAN), etc. do not enable cascading many devices in a single communication bus, i.e., LIN is limited to less than 16 uniquely addressable devices, and CAN is limited to less than 128 uniquely addressable devices. In addition, a defined amount of distinct addresses must be pre-assigned, hard-coded, fixed, etc. among the devices before they are used.

Further, conventional serial communication protocol technologies select a single type of physical layer (PHY) interface for a transmission line between devices, even though different communication environments may benefit from using an alternate type of PHY interface within such environments. For example, although single-ended transistor-transistor logic (TTL) based interfaces may be easy to use and connect to corresponding devices, such interfaces suffer from poor EMI emission characteristics. In another example, although low voltage differential signal (LVDS) based interfaces may reduce generation of electromagnetic noise, such interfaces may not easily communicate with a processing device, e.g., a microcontroller unit (MCU), having a single-ended, serial, etc. communication interface.

Furthermore, conventional communication protocols do not facilitate monitoring and/or recovering from adverse impedance condition, e.g., high/low impedance, open/short circuit states, etc. at a PHY interface that may be due, e.g., to mechanical degradation, damage, semiconductor packaging issues, printed circuit board (PCB) defects, wiring defects, etc.

In this regard, conventional communication protocol technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 6 illustrates logic implemented in a device of dynamically addressable daisy-chained serial communication devices having configurable physical layer interfaces, in accordance with various example embodiments;

FIGS. 16-18 illustrate flowcharts of a method associated with a device of a dynamically addressable daisy-chained group of devices having configurable physical layer interfaces, in accordance with various example embodiments.

DETAILED DESCRIPTION

Figure 1:
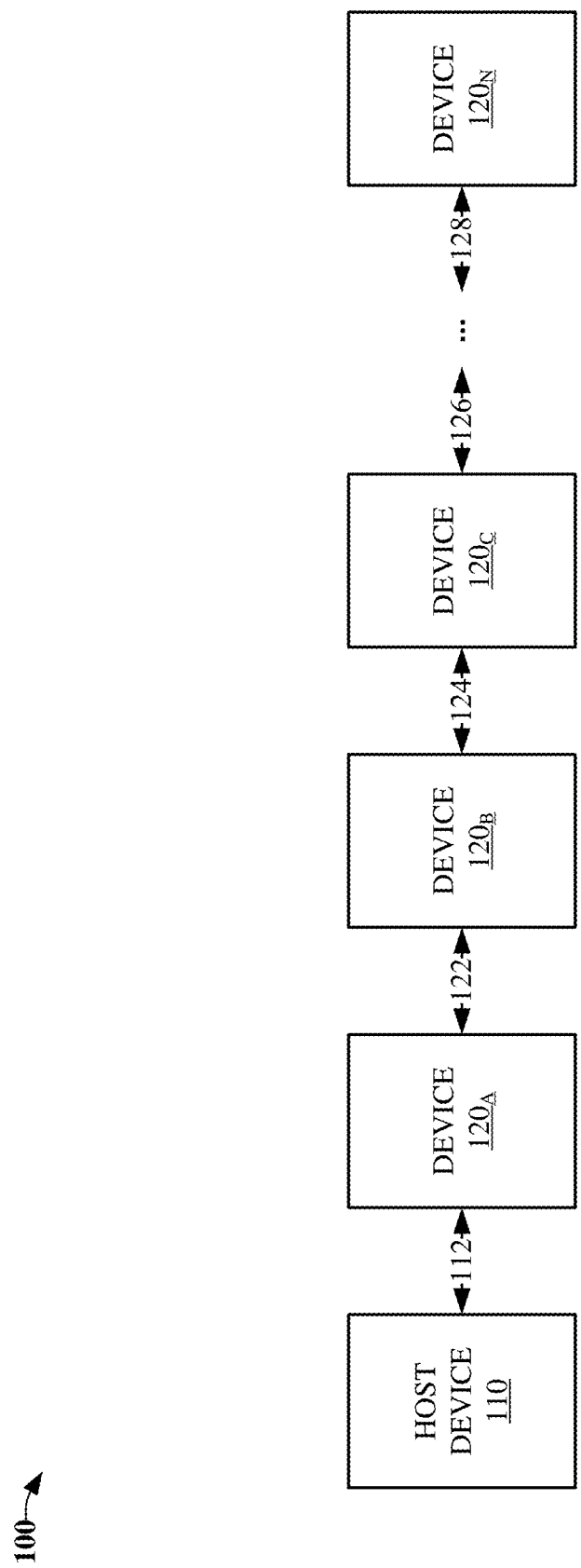
FIG. 1 illustrates a block diagram of a system including dynamically addressable daisy-chained serial communication devices having configurable physical layer interfaces, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional serial communication technologies limit a number of addressable devices that can be cascaded in a single communication bus, hardcode device addresses among the devices, fix a type of PHY interface between devices, and do not facilitate monitoring and/or recovering from adverse impedance conditions at a PHY interface. On the other hand, various embodiments disclosed herein can facilitate ad hoc daisy-chaining of many dynamically addressable devices having configurable PHY interfaces together in a serial manner.

For example, a system, e.g., an automotive based system, an industrial based system, etc. comprises: a group of devices, e.g., light emitting diode (LED) devices, sensor devices, etc. communicatively coupled with respective devices of the group of devices in a daisy-chained manner, e.g., linear series, daisy-chain, in sequence, etc. via PHY interfaces of the respective devices—the PHY interfaces being selected, configured, etc. from a group of available communication protocol configurations including an LVDS based PHY configuration, a CAN based PHY configuration, and a single-ended serial communication PHY configuration, e.g., based on CMOS or TTL transistor logic.

Further, a host device, e.g., microcontroller, processing device, MCU, etc. is directly connected, using a single-ended Manchester encoded serial communication interface, to a foremost, leading, initial etc. device of the group of devices of the linear series, daisy-chain, sequence, etc. In turn, the host device is communicatively coupled, via the foremost, leading, initial, etc. device, to successive devices of the linear series, daisy-chain, sequence, etc. using the single-ended Manchester encoded serial communication interface.

In embodiment(s), the single-ended Manchester encoded communication interface is a bi-directional half-duplex communication interface.

In other embodiment(s), each device of the group of devices comprises an interface detection component that determines, based on voltage levels of a PHY interface of the PHY interfaces corresponding to the device, a communication protocol configuration of the group of available communication protocol configurations corresponding to the PHY interface. In embodiment(s), the voltage levels have been, e.g., externally applied via discrete resistors, internally applied via programmable pull-up/pull-down resistors, etc.

In yet other embodiment(s), each device of the group of devices comprises a physical path diagnostic component that detects an impedance state of the PHY interface and/or a logic state of the PHY interface. In turn, based on the impedance state and/or the logic state, the physical path diagnostic component determines whether a differential PHY interface corresponding to the device is operable with respect to the group of devices.

In this regard, in one embodiment, in response a determination, based on the impedance state and/or the logic state, that the PHY interface is inoperable with respect to a differential communication protocol configuration of the group of available communication protocol configurations, the physical path diagnostic component reconfigures the PHY interface according to the single-ended communication protocol configuration of the group of available communication protocol configurations.

In another embodiment, in response to a determination, based on the impedance state and/or the logic state, that the PHY interface is inoperable with respect to the available communication protocol configurations, the physical path diagnostic component terminates downstream transmissions, and sends, outputs, etc. an error status directed to the host device.

In embodiment(s), the host device communicates with each device of the group of devices by sending, via the single-ended Manchester encoded communication interface, a message frame command—the message frame command including a distinct device address corresponding to, being addressed to, etc. only the device, a global address corresponding to, being addressed to, etc. all devices of the group of devices, or a group address corresponding to, being addressed to, etc. a portion of the group of devices.

In this regard, in other embodiment(s), each device of the group of devices comprises a command decoder component that assigns the distinct device address to an assigned address of the device in response to the message frame command being determined to be an initialization command directing the device to assign the distinct device address to the assigned address of the device.

In turn, in response to the distinct device address being assigned to the assigned address of the device, the command decoder component of the device increments the distinct device address to obtain a downstream distinct device address, generates another message frame command comprising another initialization command including the downstream distinct device address, and sends, via a PHY interface of the PHY interfaces communicatively coupling the device to a downstream device of the successive devices that is directly downstream of the device, the other message frame command comprising the other initialization command to the downstream device to facilitate an assignment of the downstream distinct device address to the downstream device.

In an embodiment, in response to the message frame command being determined to be the initial command, and in response to the initial command being determined not to be the initialization command, the command decoder component of the device terminates downstream transmissions, and sends, outputs, etc. an error status directed to the host device.

In one embodiment, in response to the message frame command being determined not to be the initial command, and in response to the distinct device address being determined to be equal to the assigned address of the device, the command decoder component of the device executes the message frame command—without transmitting the message frame command to a downstream device.

In another embodiment, in response to the message frame command being determined not to be the initial command, and in response to the distinct device address being determined not to be equal to the assigned address of the device, the command decoder component of the device re-transmits, via the PHY interface of the PHY interfaces communicatively coupling the device to the downstream device, the message frame command to the downstream device.

In yet another embodiment, the host device further comprises a message payload component that determines an amount, number, etc. of bytes to be transferred via the message frame command, and includes the amount, number, etc. of bytes in a payload size field of the message frame command to facilitate a determination, by the device, of a total message frame length of the message frame command.

In embodiment(s), a device, e.g., LED device, etc. comprises: a PHY component comprising a pair of PHY interfaces that facilitate communication with respective devices of a group of devices that are communicatively coupled in a daisy-chained manner—the PHY interfaces corresponding to, comprising, etc. a group of available communication protocol configurations comprising an LVDS based PHY configuration, a CAN based PHY configuration, and/or a single-ended serial communication PHY configuration comprising a CMOS based interface or a TTL based interface; and a command decoder component that, in response to the device being powered up, receives an initial message frame command comprising an initialization command that designates a distinct device address to be assigned to a device address of the device, and assigns the distinct device address to the device address to facilitate receiving, based on the device address, other message frame commands from a host device that is communicatively coupled to the group of devices via a foremost device of the group of devices using a single-ended Manchester encoded serial communication interface.

In other embodiment(s), the initialization command is a first initialization command, and the command decoder component: in response to the distinct device address being assigned to the device address of the device, increments the distinct device address to obtain a downstream device address, generates a message frame command comprising a second initialization command comprising the downstream device address, and sends, via a PHY interface of the pair of PHY interfaces communicatively coupling the device to a downstream device of the group of devices that is directly downstream of the device, the message frame command comprising the second initialization command to the downstream device to facilitate an assignment of the downstream device address to the downstream device.

In yet other embodiments, the command decoder component: in response to the distinct device address being assigned to the device address, and in response to a message frame command comprising the device address being received, executes the message frame command; and in response to the distinct device address being assigned to the device address, and in response to a message frame command that does not comprise the device address being received, re-transmits, via the PHY interface of the pair of PHY interfaces communicatively coupling the device to the downstream device, the message frame command that does not comprise the device address to the downstream device.

In an embodiment, the device comprises an interface detection component that determines a communication protocol configuration of the group of available communication protocol configurations of a PHY interface of the pair of PHY interfaces based on voltage levels that have been applied to the PHY interface.

In one embodiment, the device comprises a physical path diagnostic component that detects an impedance state of the PHY interface and/or a logic state of the PHY interface; and based on the impedance state and/or the logic state, determines whether the PHY interface is operable with respect to the available communication protocol configurations.

In another embodiment, a method comprises: in response to a device of a series of devices that are communicatively coupled to respective adjacent devices of the series of devices in a daisy-chain manner being powered up, determining, by the device, a communication protocol configuration of a group of available communication protocol configurations of a PHY interface of PHY interfaces of the device based on voltage levels that have been applied to the PHY interface—the group of available communication protocol configurations comprising an LVDS based PHY configuration, a CAN based PHY configuration, and/or a single-ended serial communication PHY configuration comprising CMOS based logic or TTL based logic; detecting, by the device, an impedance state of the PHY interface and/or a logic state of the PHY interface; and based on the impedance state and/or the logic state, determining, by the device, whether the PHY interface is operable with respect to the available communication protocol configurations.

In yet another embodiment, the method further comprises: in response to receiving, by the device via an upstream PHY interface of the PHY interfaces of the device, an initial message frame command comprising an initialization command that designates a distinct device address to be assigned to a device address of the device, assigning, by the device, the distinct device address to the device address of the device, incrementing, by the device, the distinct device address to obtain a downstream device address, generating, by the device, a message frame command comprising a generated initialization command comprising the downstream device address, and sending, by the device via a downstream PHY interface of the PHY interfaces of the device communicatively coupling the device to a downstream device of the group of devices that is immediately downstream of the device, the message frame command comprising the generated initialization command to the downstream device.

In an embodiment, the message frame command is a first message frame command, and the method further comprises: in response to the distinct device address being assigned to the device address, and in response to a second message frame command comprising the device address being received, executing, by the device, the second message frame command and not further transmitting the second message frame command to the downstream device.

Further, the method comprises: in response to the distinct device address being assigned to the device address, and in response to a third message frame command that does not comprise the device address being received by the device, re-transmitting, by the device via the downstream PHY interface of the PHY interfaces, the third message frame command to the downstream device.

As described above, conventional serial communication technologies have had some drawbacks with respect to limiting a number of addressable devices that can be cascaded in a single communication bus, fixing types of respective PHY interfaces communicatively coupling such devices, and recovering from adverse impedance conditions on the respective PHY interfaces. On the other hand, various embodiments disclosed herein can facilitate ad hoc daisy-chaining of dynamically addressable devices having configurable PHY interfaces together in a serial manner, and can facilitate recovery from adverse impedance conditions on the configurable PHY interfaces.

Embodiments of devices described herein include a serial communication protocol able to adapt to and/or utilize different PHY specifications, configurations, etc., selected via voltage levels, to enable ease of interfacing with a host unit/device, e.g., MCU, field programmable gate array (FPGA), processing device, controller, etc. For example, such voltage levels can be used to select, program, etc. a PHY interface to utilize, e.g., an automotive (e.g., CAN flexible data-rate (CAN-FD) communication protocol to improve signaling characteristics over a long transmission path coupling corresponding devices; a small signal differential format (e.g., LVDS) to reduce electromagnetic interference (EMI), etc.

In embodiment(s), the serial communication protocol includes an intelligent diagnostic feature to detect any open/short connection along the communication path, PHY interface, etc., and in response to detection of the open/short connection, convert a differential path into a single-wire/single-ended communication PHY interface to avoid the open/short connection. On the other hand, if the device determines that no communication path is suitable/good for transmission, such diagnostic feature can terminate the transmission at the last good, e.g., operationally active, etc. device and flag a transmission status error, e.g., sending notification of such error to the host unit/device.

In turn, the serial communication protocol enables daisy-chaining up to, e.g., 1000, $<2^{10}$, etc. devices (e.g., particularly, but not specific to, LED drivers) with dedicated, distinct, etc. addressing using a 2-wire communication format, interface, etc. In this regard, communication with multiple devices is possible without using a "chip select" signal, physically hard-coding addresses, etc.

Figure 2:
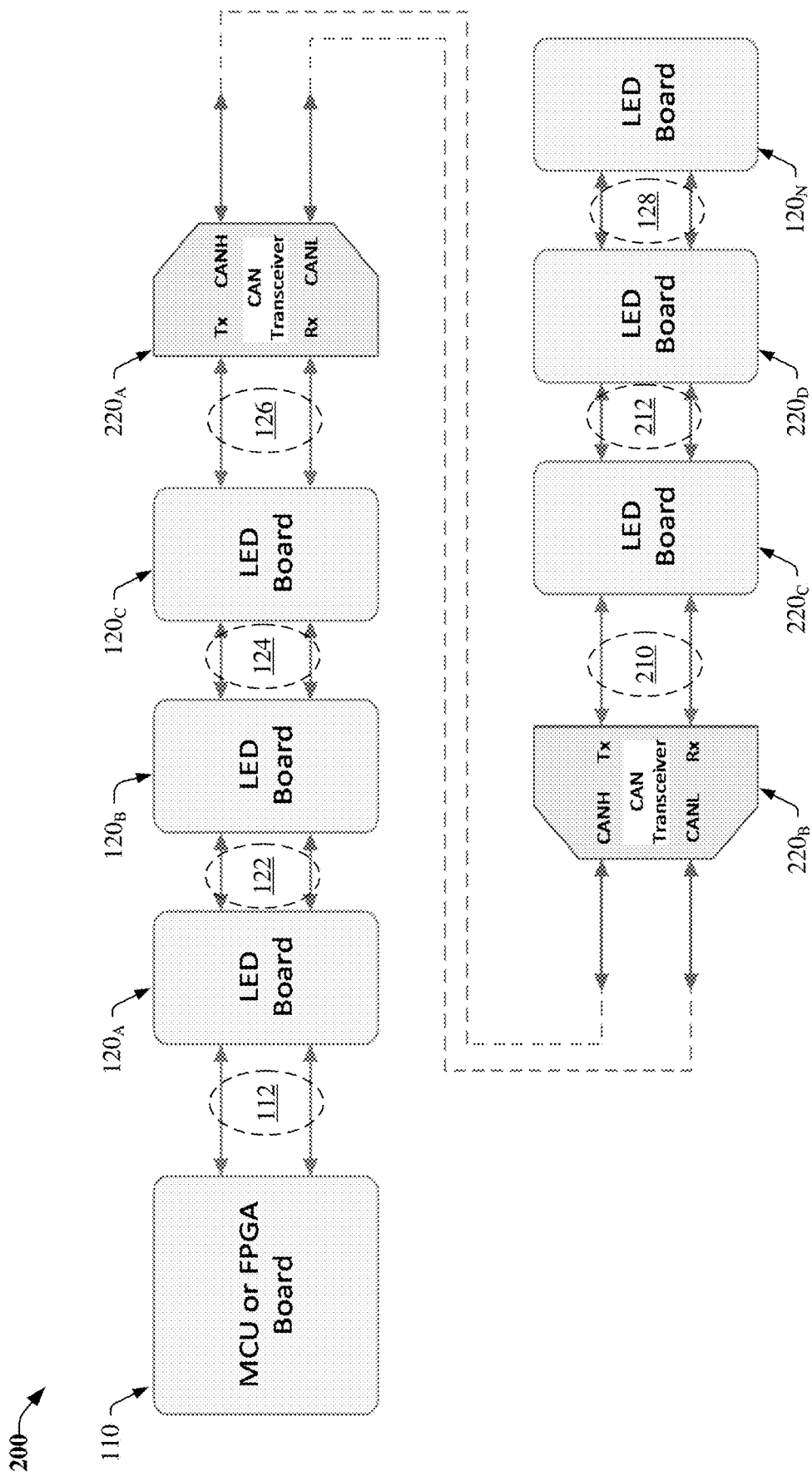
FIG. 2 illustrates a block diagram of an light emitting diode (LED) based system including dynamically addressable daisy-chained serial communication devices having configurable physical layer interfaces, in accordance with various example embodiments.
Figure 3:
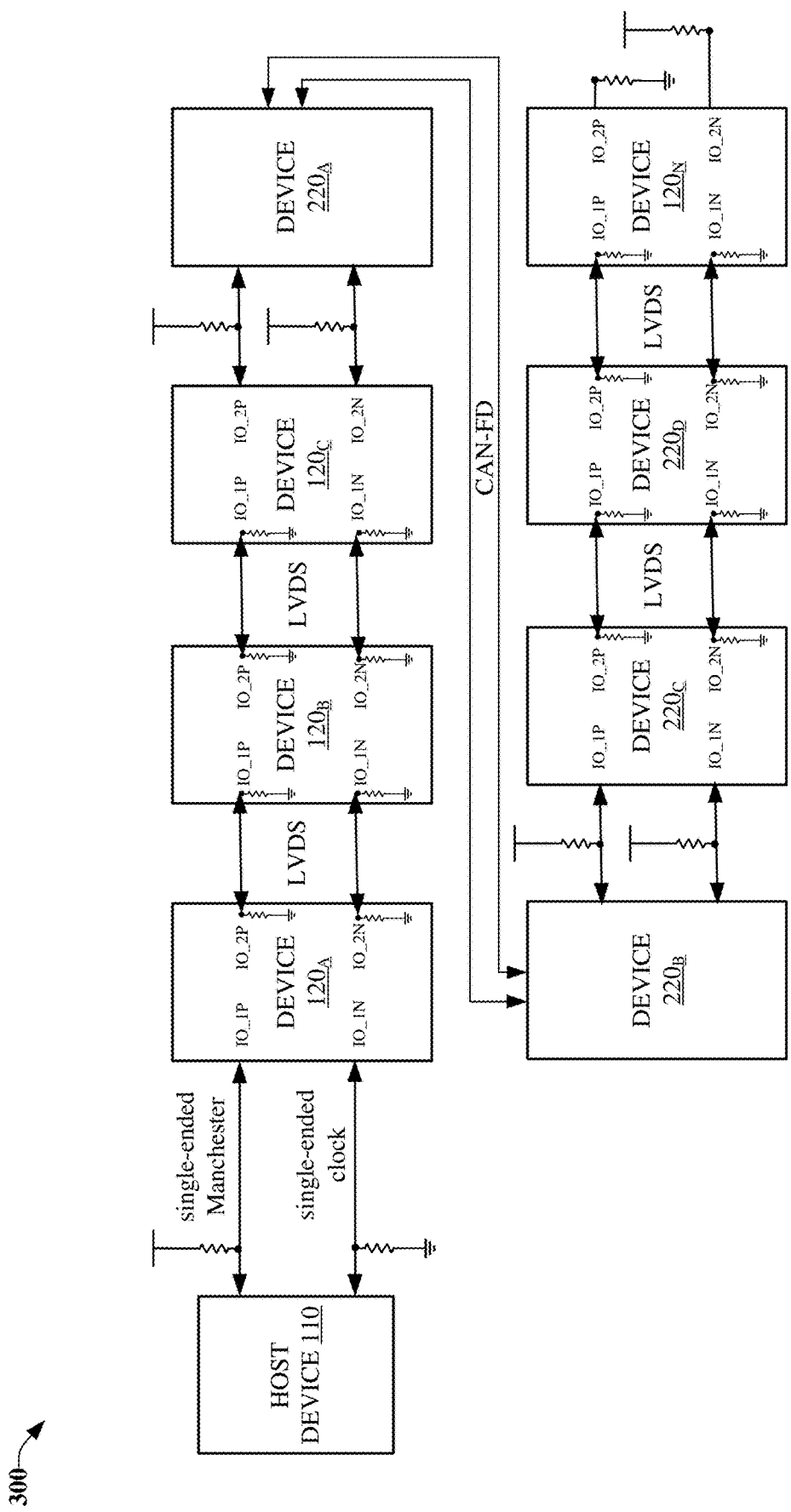
FIG. 3 illustrates another block diagram of the LED based system including dynamically addressable daisy-chained serial communication devices having configurable physical layer interfaces, in accordance with various example embodiments.

As illustrated by FIGS. 1-3, a system (e.g., 100, 200, 300), e.g., an automotive based system, an industrial based system, etc. comprises a group of devices (e.g., 120$_A$, 120$_B$, 120$_C$, 120$_N$, 220$_A$, 220$_B$, 220$_C$, 220$_D$), e.g., LED devices, sensor devices, CAN based devices, etc. communicatively coupled with respective devices of the group of devices in a daisy-chained manner, e.g., linear series, daisy-chain, in sequence, etc. via PHY interfaces (e.g., 122, 124, 126, 128,

210, 212) of the respective devices—the PHY interfaces being selected, configured, etc. from a group of available communication protocol configurations including an LVDS based PHY configuration, a CAN based PHY configuration, and a single-ended serial communication PHY configuration, e.g., based on CMOS or TTL transistor logic.

Further, a host device (110), e.g., microcontroller, processing device, MCU, etc. is directly connected, using a single-ended Manchester encoded serial communication interface (112), to a foremost, leading, initial, etc. device (120$_A$) of the group of devices of the linear series, daisychain, sequence, etc. In turn, the host device is communicatively coupled, via the foremost, leading, initial, etc. device, to successive devices of the linear series, daisychain, sequence, etc. using the single-ended Manchester encoded serial communication interface, e.g., a bi-directional half-duplex communication interface.

In this regard, the group of devices will be dynamically, and serially, assigned addresses, via respective upstream devices, in ascending order upon powering up of the devices. In embodiment(s), device addressing is volatile and will be reset, e.g., upon a device receiving, from the host device, a command, message frame command, instruction, etc. requesting the device to be reset; upon the device being power cycled, e.g., powered off and powered on, etc.

Figure 4:
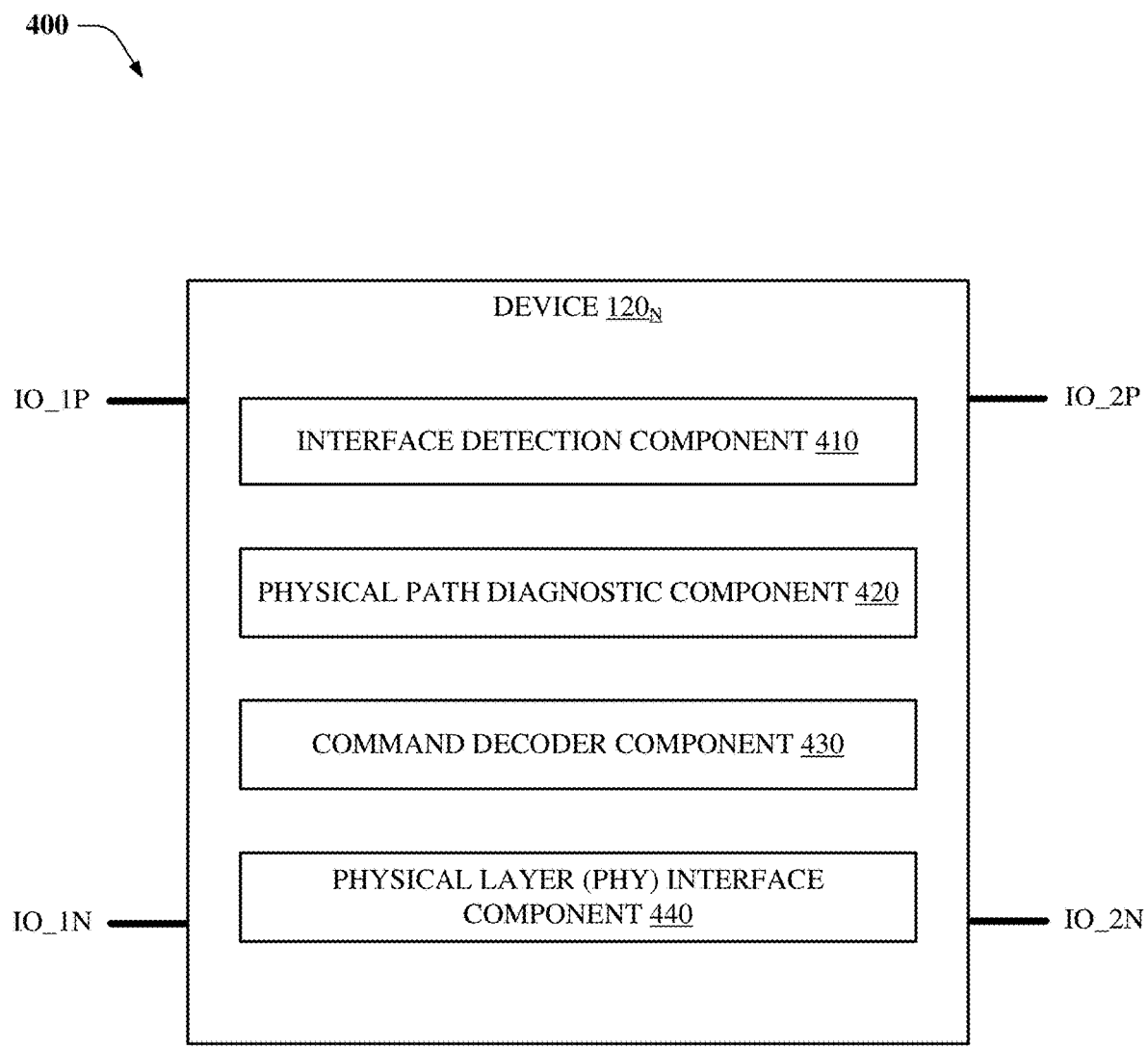
FIG. 4 illustrates a block diagram of a device of dynamically addressable daisy-chained serial communication devices having configurable physical layer interfaces, in accordance with various example embodiments.

As illustrated by block diagram (400) of FIG. 4, each device of the group of devices comprises an interface detection component (410) that determines, based on voltage levels that have been applied (e.g., externally, internally via programmable pull-up/pull-down resistors, etc.) to respective PHY interfaces of a PHY interface component (440) of the device, a communication protocol configuration of the group of available communication protocol configurations of the respective PHY interfaces.

Figure 5:
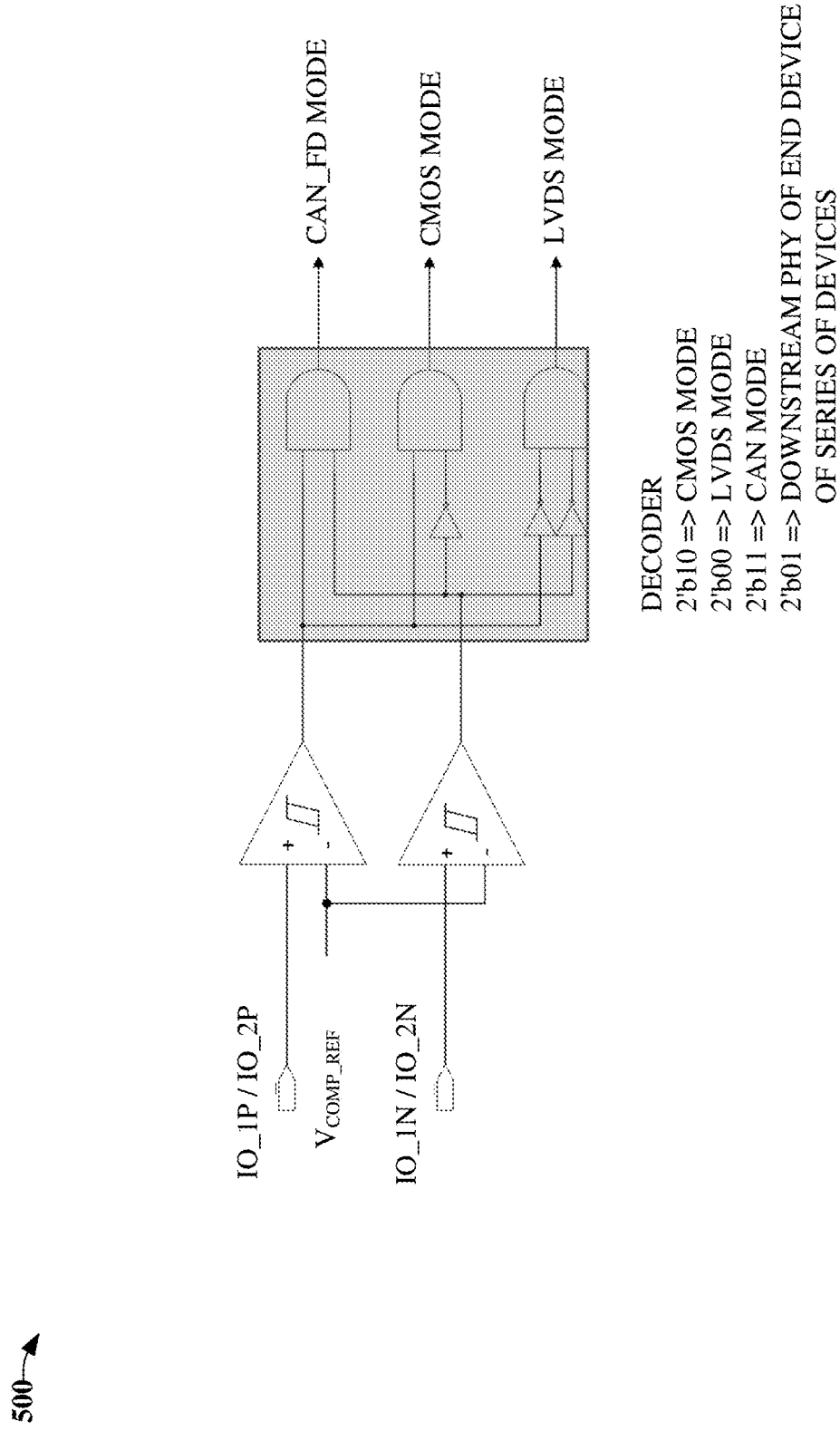
FIG. 5 illustrates a decoder circuit for detecting a configuration of a PHY interface, in accordance with various example embodiments.

Referring now to decoder circuit (500) of FIG. 5, the device detects, in response to a power-on-reset using a pair of comparators and a decoder circuit of the interface detection component, respective configurations of an upstream PHY interface, e.g., corresponding to input/output (I/O) pins "IO_1P" and "IO_1N, and a downstream PHY interface, e.g., corresponding to I/O pins "IO_2P" and "IO_2N" based on external and/or internal voltage levels that have been applied to the I/O pins. In this regard, a pull-up resistor on IO_1P/IO_2P and a pull-down resistor IO_1N/IO_2N designates a CMOS configuration for a PHY interface; pull-down resistors on IO_1P/IO_2P and IO_1N/IO_2N designate an LVDS configuration for the PHY interface; pull-up resistors on IO_1P/IO_2P and IO_1N/IO_2N designate a CAN based configuration for the PHY interface; and a pull-down resistor on IO_2P and a pull-up resistor IO_2N designates that the device is an end device of the group of devices.

FIG. 6 illustrates logic (600) implemented in the device corresponding to the upstream and downstream PHY interfaces, in accordance with various example embodiments. In this regard, the logic controls the direction of data flow to/from the device. By default, a direction signal ("DIRECTION") is asserted, e.g., as a logic low, to set the direction of data flow of the device from the upstream PHY interface, into the device, and out of the device via the downstream PHY interface. When the direction signal is asserted in an opposite state, e.g., as a logic high, the direction of data flow of the device is reversed, i.e., from the downstream PHY interface, into the device, and out of the device via the upstream PHY interface.

Returning to FIG. 4, each device of the group of devices further comprises a physical path diagnostic component (420) that detects an impedance state of a PHY interface of the PHY interfaces corresponding to the device, and/or detects a logic state of the PHY interface. In turn, based on the impedance state and/or the logic state (e.g., of IO_1P, IO_1N, IO_2P, IO_2N), the physical path diagnostic component determines whether the PHY interface corresponding to the device is operable with respect to the available communication protocol configurations, e.g., the LVDS based PHY configuration, the CAN based PHY configuration, or the single-ended serial communication PHY configuration.

In this regard, in one embodiment, in response to a determination, based on the impedance state and/or the logic state, that the PHY interface is inoperable with respect to a differential communication protocol configuration of the group of available communication protocol configurations, the physical path diagnostic component reconfigures the PHY interface according to the single-ended communication protocol configuration of the group of available communication protocol configurations, e.g., diverting transmission/reception of single-ended signals to a remaining good, operable, etc. path of the PHY interface, e.g., from IO_1P/IO_1N of the PHY interface to IO_1N/IO_1P of the PHY interface.

In another embodiment, in response to a determination, based on the impedance state and/or the logic state, that the PHY interface is inoperable with respect to the available communication protocol configurations, the physical path diagnostic component terminates downstream transmissions, and sends, outputs, etc. an error status directed to the host device.

Figure 7:
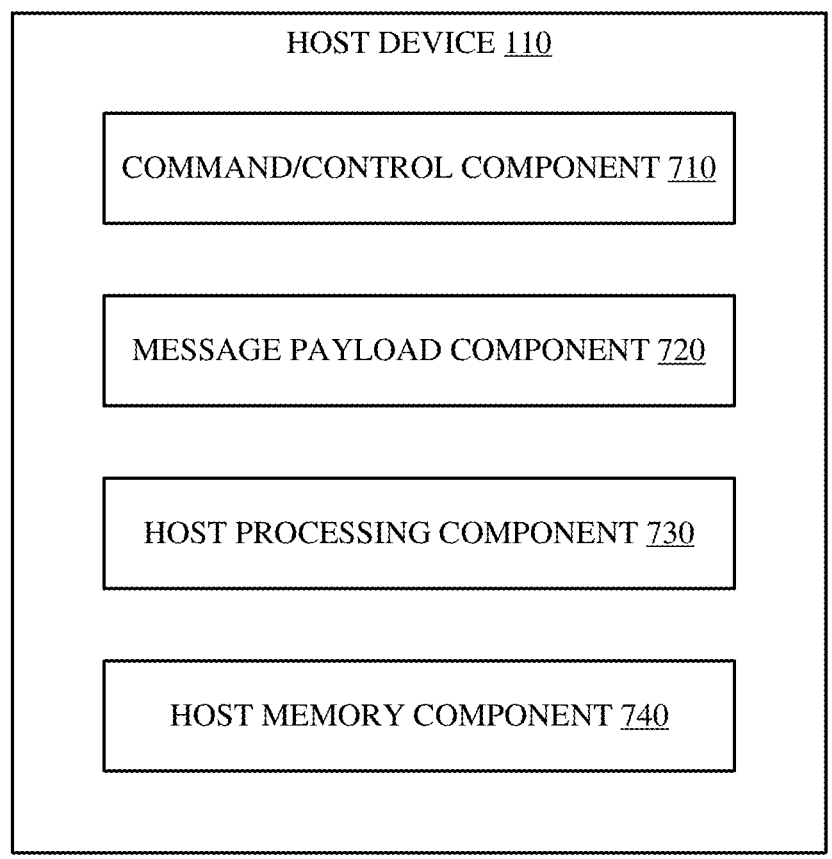
FIG. 7 illustrates a host device, in accordance with various example embodiments.

Referring now to FIG. 7, the host device (700), via a command/control component (710), communicates with each device of the group of devices by sending, via the single-ended Manchester encoded communication interface, a message frame command—the message frame command including a distinct device address corresponding to, being addressed to, etc. only the device; a global address corresponding to, being addressed to, etc. all devices of the group of devices; or a group address corresponding to, being addressed to, etc. a portion of the group of devices, e.g., the group address being reserved, via the host device, to enable a message frame command to be directed to the portion of the group of devices.

In this regard, subsequent message frame commands that are sent after the initialization command that carry an address field equal to 0—representing the global address—are global commands directed to, applicable to, etc. all devices of the group of devices, in which each of the devices will execute a global command and transmit the global command to a respective downstream devices.

In embodiment(s), each device of the group of devices comprises a command decoder component (430) that assigns the distinct device address to an assigned address of the device in response to receiving a message frame command including the distinct device address—the message frame command being determined to be an initial command that is an initialization (INITIAL) command directing the device to assign the distinct device address to the assigned address of the device.

In this regard, in response to the device being powered up, e.g., in response to a power-on reset of the device, the device awaits receiving the initial command including the initialization command with the distinct device address. In turn, in response to an initial message frame command comprising the initialization command designating the distinct device address to be assigned to the assigned address of the device being determined, e.g., via a serial-to-parallel converter, etc. to be received, the command decoder component assigns the distinct device address to the device address to facilitate receiving, based on the device address, other message frame commands from a host device that is communicatively coupled to the group of devices via a foremost device of the group of devices using a single-ended Manchester encoded serial communication interface.

In turn, in response to the distinct device address being assigned to the assigned address of the device, the command decoder component increments the distinct device address to obtain a downstream distinct device address, generates, e.g., via a parallel-to-serial converter, etc. that converts the downstream distinct device address into a serialized bit-stream to be transmitted to a downstream device of the successive devices that is directly downstream of the device, another message frame command comprising another initialization command including the downstream distinct device address, and sends, via a PHY interface of the PHY interfaces communicatively coupling the device to the downstream device, the other message frame command comprising the other initialization command to the downstream device to facilitate an assignment of the downstream distinct device address to the downstream device.

In an embodiment, in response to the message frame command being determined to be the initial command, and in response to the initial command being determined not to be the initialization command, the command decoder component of the device terminates downstream transmissions, and sends, outputs, etc., via an upstream device, an error status directed to the host device.

In one embodiment, in response to the message frame command being determined not to be the initial command, and in response to the distinct device address being determined to be equal to the assigned address of the device, the command decoder component of the device executes the message frame command, without further transmitting the message frame command to the downstream device.

In another embodiment, in response to the message frame command being determined not to be the initial command, and in response to the targeted device address being determined not to be equal to the assigned address of the device, the command decoder component of the device re-transmits, via the PHY interface of the PHY interfaces communicatively coupling the device to the downstream device, the message frame command to the downstream device.

Figure 8:
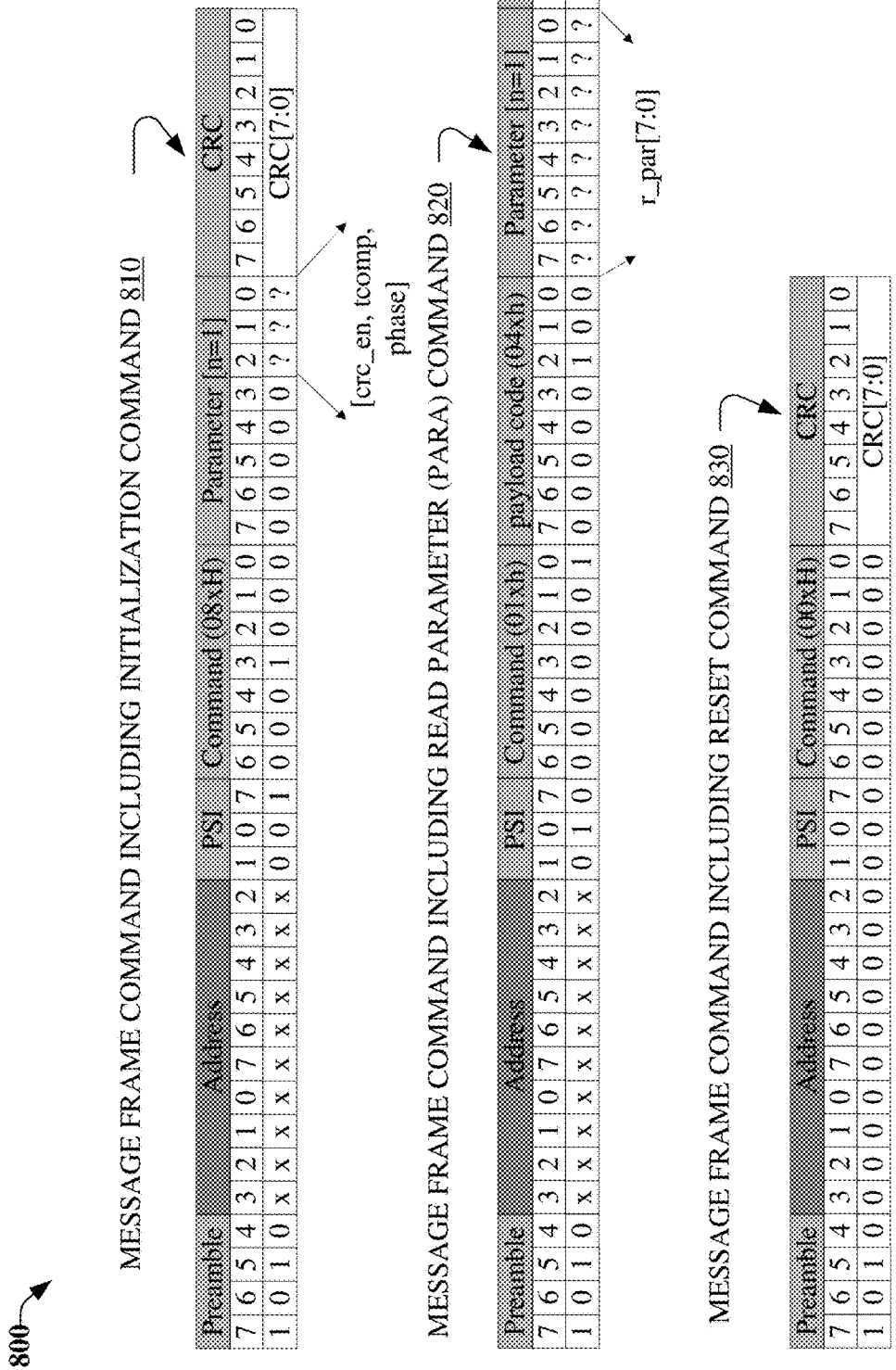
FIG. 8 illustrates a portion of message frame commands that can be received from the host device, in accordance with various example embodiments.

FIG. 8 illustrates a portion of message frame commands (800) that can be received from the host device, e.g., via the command control component of the host device, in accordance with various example embodiments. Such message frame commands including an initialization command 810; a read parameter command 820, e.g., for reading various register values of the device representing information corresponding to the device; and a reset command 830 directing the device to perform a software reset.

In embodiment(s), in response to receiving a message frame command including the read parameter command that is addressed to a device, the device stops, prevents, etc. downstream transmission(s), and processes information, e.g., data, payload selection index, cyclic-redundancy check (CRC), etc. information included in the message frame command, e.g., utilizing a serial-to-parallel converter, registers, corresponding decoder(s), etc. In turn, the device will transmit, via an upstream device that is directly upstream from the device, a response message frame in the opposite direction back to, directed to, etc. the host device. It should be appreciated that the host device, via a host processing component (730) and a host memory component (740), is responsible for overall command processing, timing control and device control.

In other embodiment(s), regarding the initialization command being sequentially sent downstream from device-to-device based on processing of the initialization command as described above, in response to a last, end, etc. device of the group of devices determining, via the interface detection component during power up of the last device, that it is the last device in the series, daisy-chain, etc. of the group of devices, the last device will set a device flag, last device flag, etc. representing that it is the last device. In this regard, when the last device receives the initialization command, the last device will send, based on the last device flag being set, an upstream message frame—including a device address of the last device and a circuit error flag—directed to the host device via an upstream device that is directly upstream of the last device. In turn, remaining upstream devices of the group, series, etc. of devices will direct the upstream message frame to the host device. In this way, the host device can determine the total number of devices that have been serially connected, e.g., in an ad-hoc manner, in the group, series, etc. of devices using the address that was included in the initial message frame command, i.e., which was set by the host device, and the device address of the last device that was received in the upstream message frame.

Figure 9:
FIG. 9 illustrates a payload selection index corresponding to a message frame command, in accordance with various example embodiments.

Referring now to FIGS. 7 and 9, the host device includes a message payload component (720), in accordance with various example embodiments. The message payload component determines an amount, number, etc. of bytes to be transferred via the message frame command, and includes such information in a payload size field of the message frame command to facilitate a determination, by the device, of a total message frame length of the message frame command, e.g., to optimize transmission speed, bandwidth utilization, etc. via variable message frame lengths of messages that are sent from the host device to downstream devices. In this regard, different commands and/or instructions that are sent by the host device include respective payload frame sizes, payload sizes, etc. that are just adequate, optimized, etc. to convey corresponding information to respective devices of the downstream devices. As illustrated by FIG. 9, the payload size is represented by a 3-bit payload selection index ("PSI") (900), e.g., "PSI[2:0]", that is included in a command, message frame command, instruction, etc., in which the payload size varies from 1-byte to 8-bytes of length.

Figure 10:
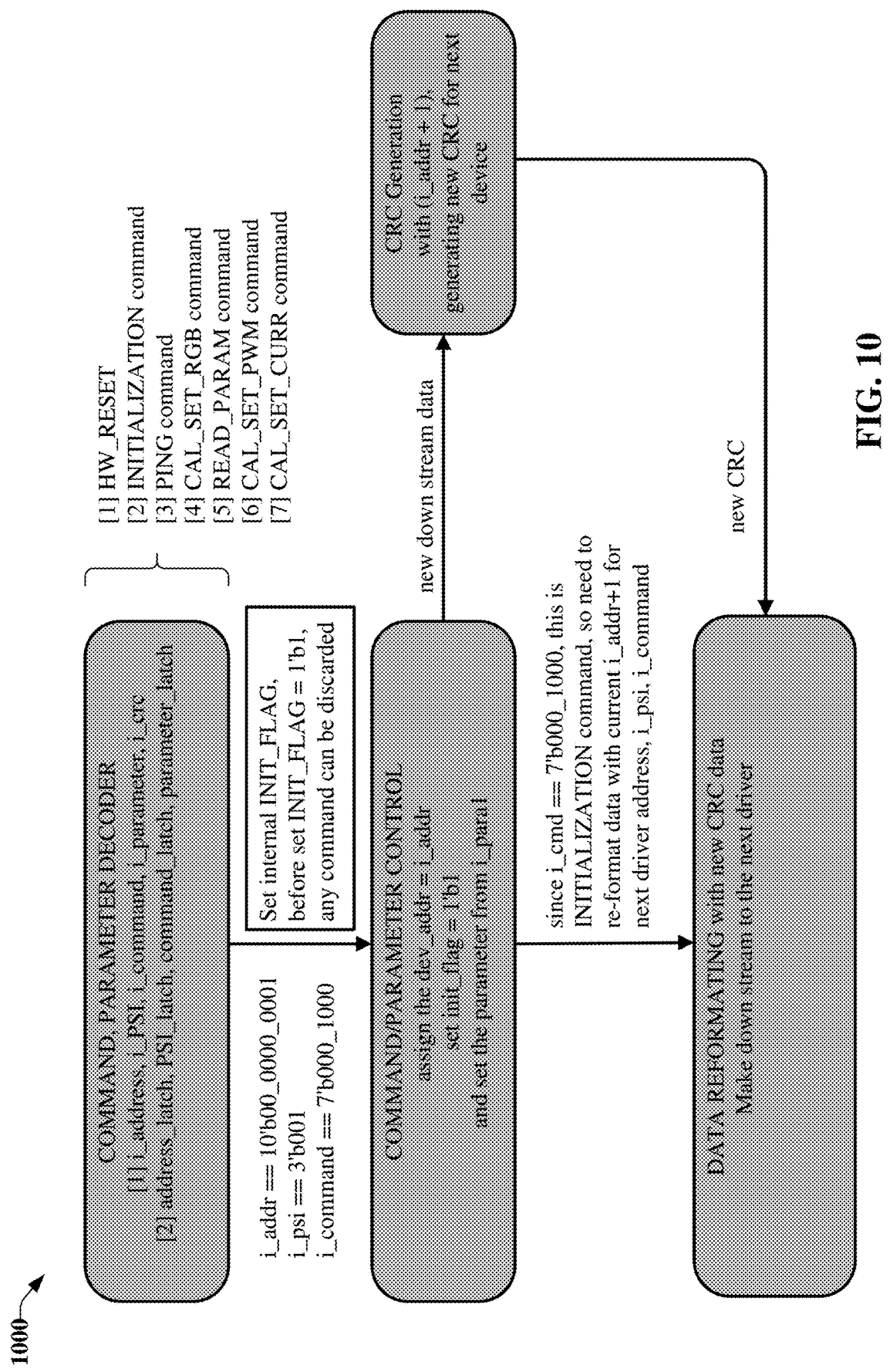
FIG. 10 illustrates a diagram of an initialization command process, in accordance with various example embodiments.
Figure 11:
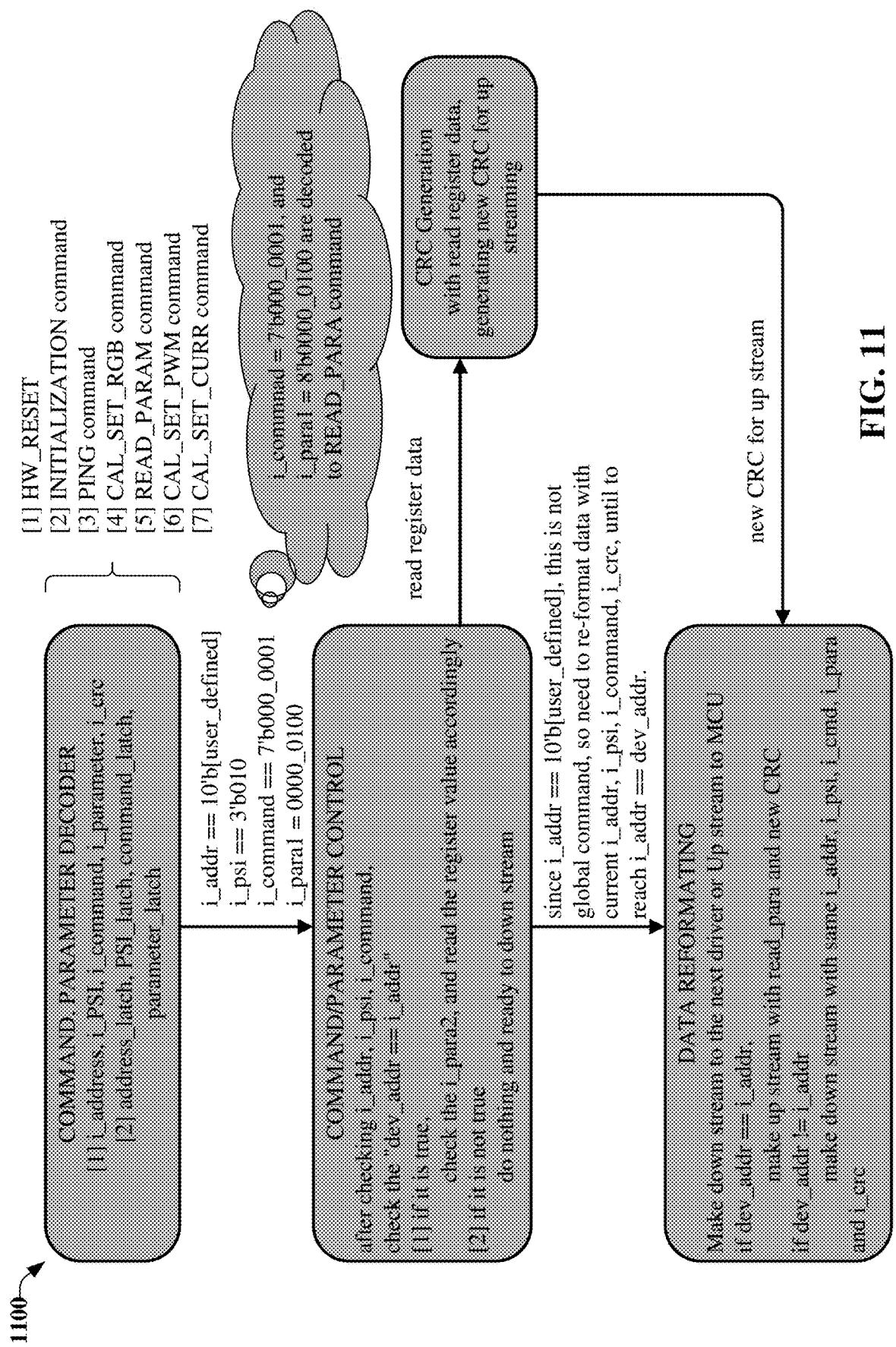
FIG. 11 illustrates a diagram of a read parameter (PARAM) command process, in accordance with various example embodiments.
Figure 12:
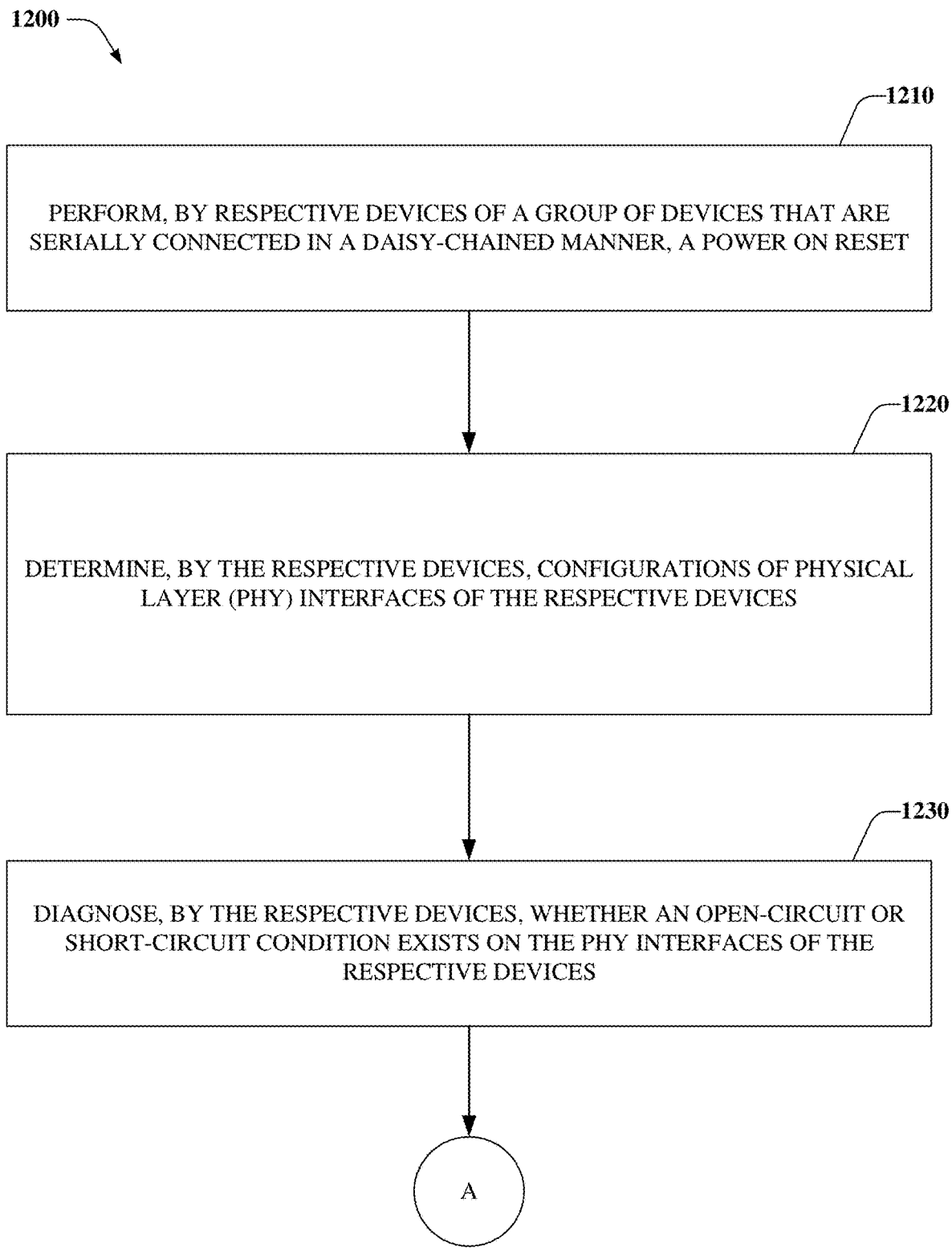
FIGS. 12-15 illustrate flowcharts of an initialization command method associated with a system including dynamically addressable daisy-chained serial communication devices having configurable physical layer interfaces, in accordance with various example embodiments.
Figure 13:
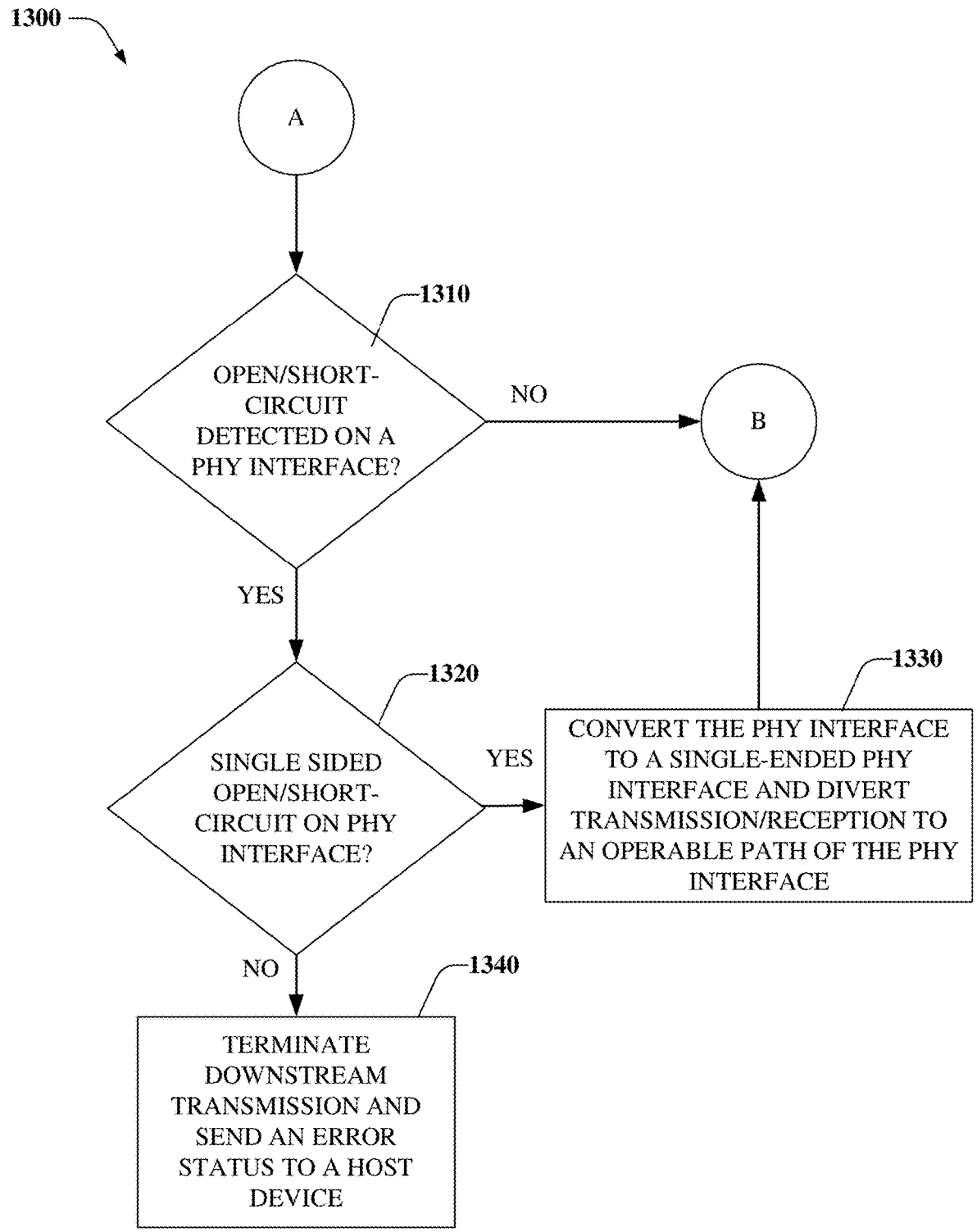
Figure 14:
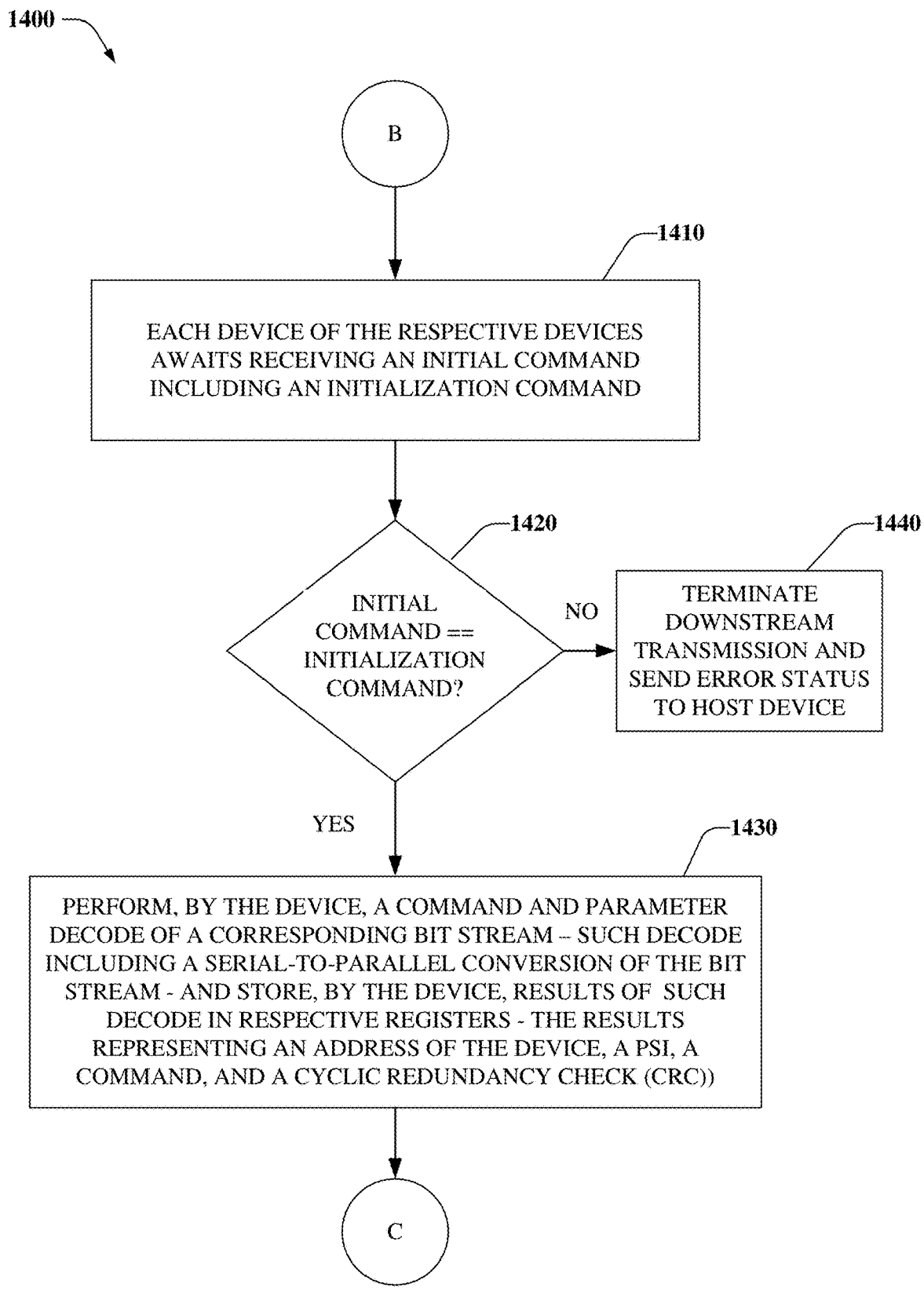
Figure 15:
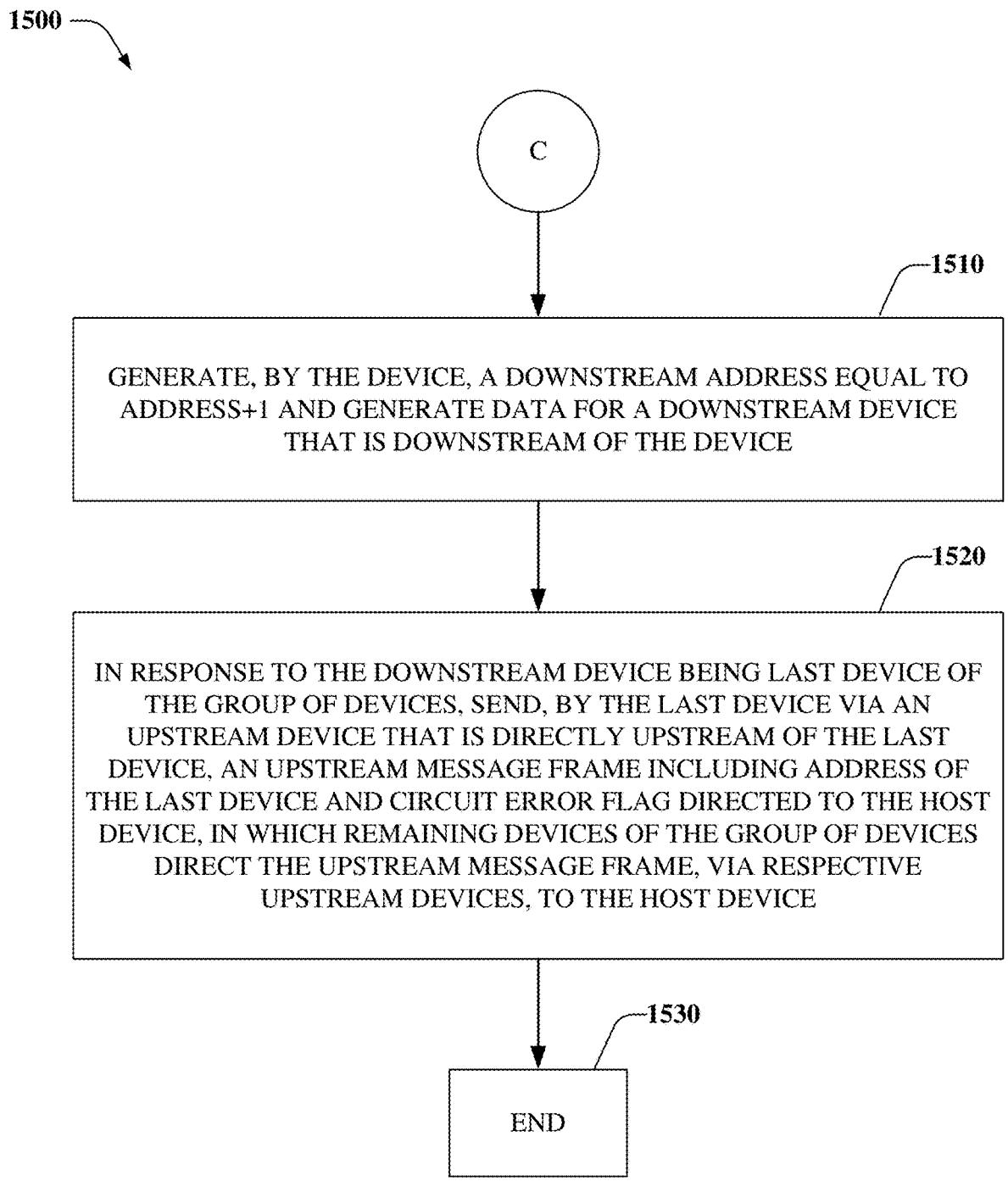

FIGS. 10 and 11 illustrate diagrams of an initialization command process (1000) and a read parameter (PARAM) command process (1100), respectively, in accordance with various example embodiments. In this regard, such diagrams illustrate address, PSI, command, parameter, etc. values and corresponding process flow performed via the command decoder component of each device of the group of devices.

FIGS. 12-17 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Referring now to FIGS. 12-15, flowcharts (1200-1500) of an initialization command method associated with dynamically addressable daisy-chained serial communication with configurable physical layer interfaces are illustrated, in accordance with various example embodiments. At 1210, a power on reset is performed by respective devices of a group of devices that are serially connected in a daisy-chained manner. At 1220, the respective devices determine configurations of PHY interfaces of the respective devices. At 1230, the respective devices diagnose whether an open-circuit or short-circuit condition exists on the PHY interfaces.

At 1310, in response to a device of the respective devices determining that an open/short circuit condition exists on a PHY interface of the PHY interfaces corresponding to the device, flow continues to 1320, at which the device determines whether a single sided open-circuit or short-circuit exists on the PHY interface; otherwise flow continues to 1410, at which each device of the respective devices awaits receiving an initial command including an initialization command.

At 1320, in response to a determination that the single sided open-circuit or short-circuit exists on the PHY interface, flow continues to 1330, at which the device converts the PHY interface to a single-ended PHY interface and diverts transmission/reception of messages to an operable path of the PHY interface; otherwise flow continues to 1340, at which the device terminates downstream transmission and sends an error status to the host device.

At 1420, in response an initial command being determined, by a device of the respective devices, to be equal to an initialization command, flow continues to 1430, at which the device performs a command and parameter decode of a corresponding bit stream—such decode including a serial-to-parallel conversion of the bit stream. Further, the device stores results of the command and parameter decode in respective registers of the device—the results representing an address of the device, a PSI, a command, and a CRC; otherwise flow continues to 1440, at which the device terminates downstream transmission and sends an error status to the host device.

Flow continues from 1430 to 1510, at which the device increments the address by 1 to generate a downstream address and generates data for a downstream device that is downstream of the device. At 1520, in response to the downstream device being a last device of the group of devices, the last device sends, via an upstream device that is directly upstream of the last device, an upstream message frame including an address of the last device an a circuit error flag directed to the host device, in which remaining devices of the group of devices direct the upstream message frame, via respective upstream devices, to the host device. Flow, e.g., of the INITIAL command flow, ends at 1530.

Figure 16:
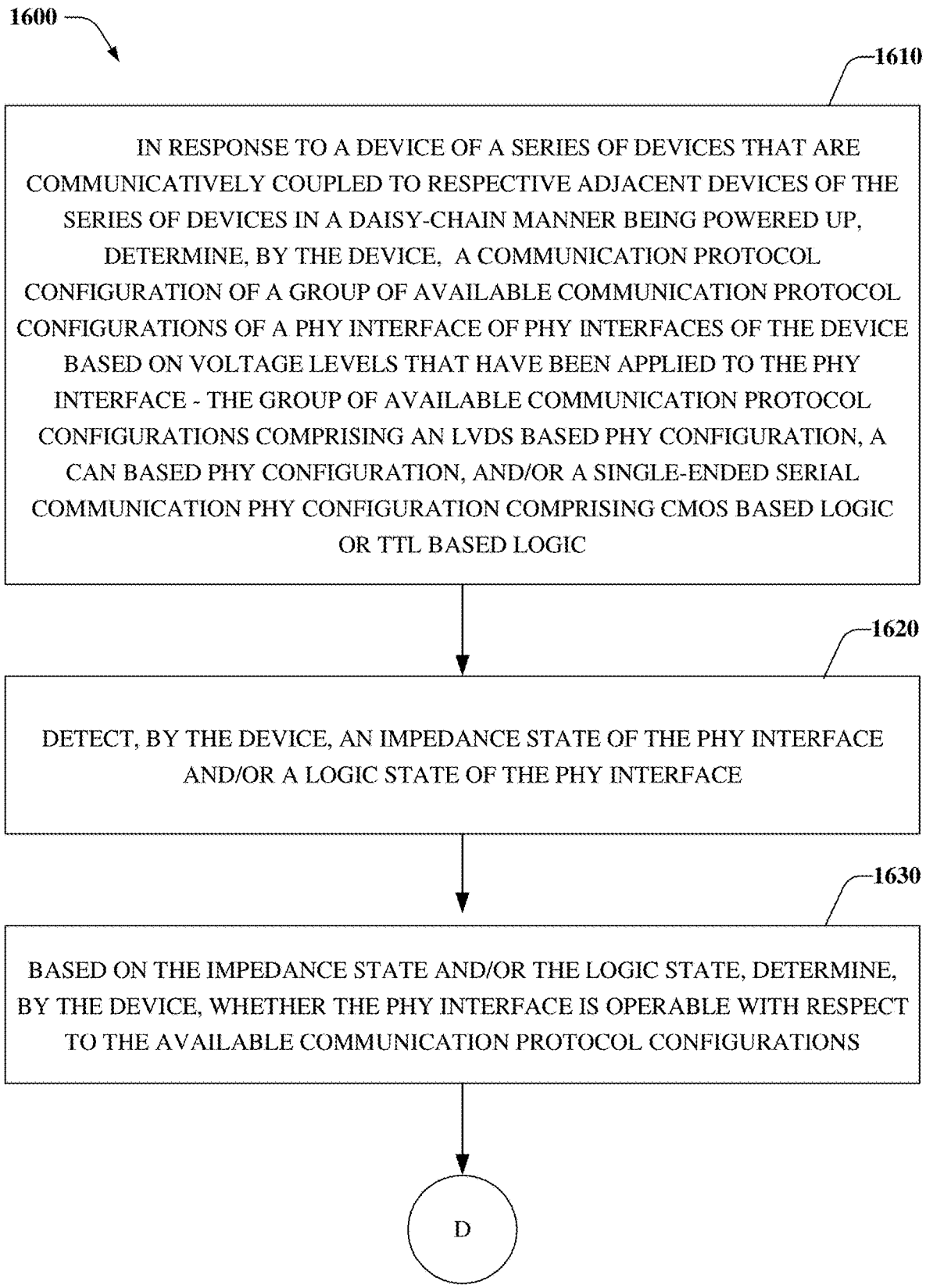
Figure 18:
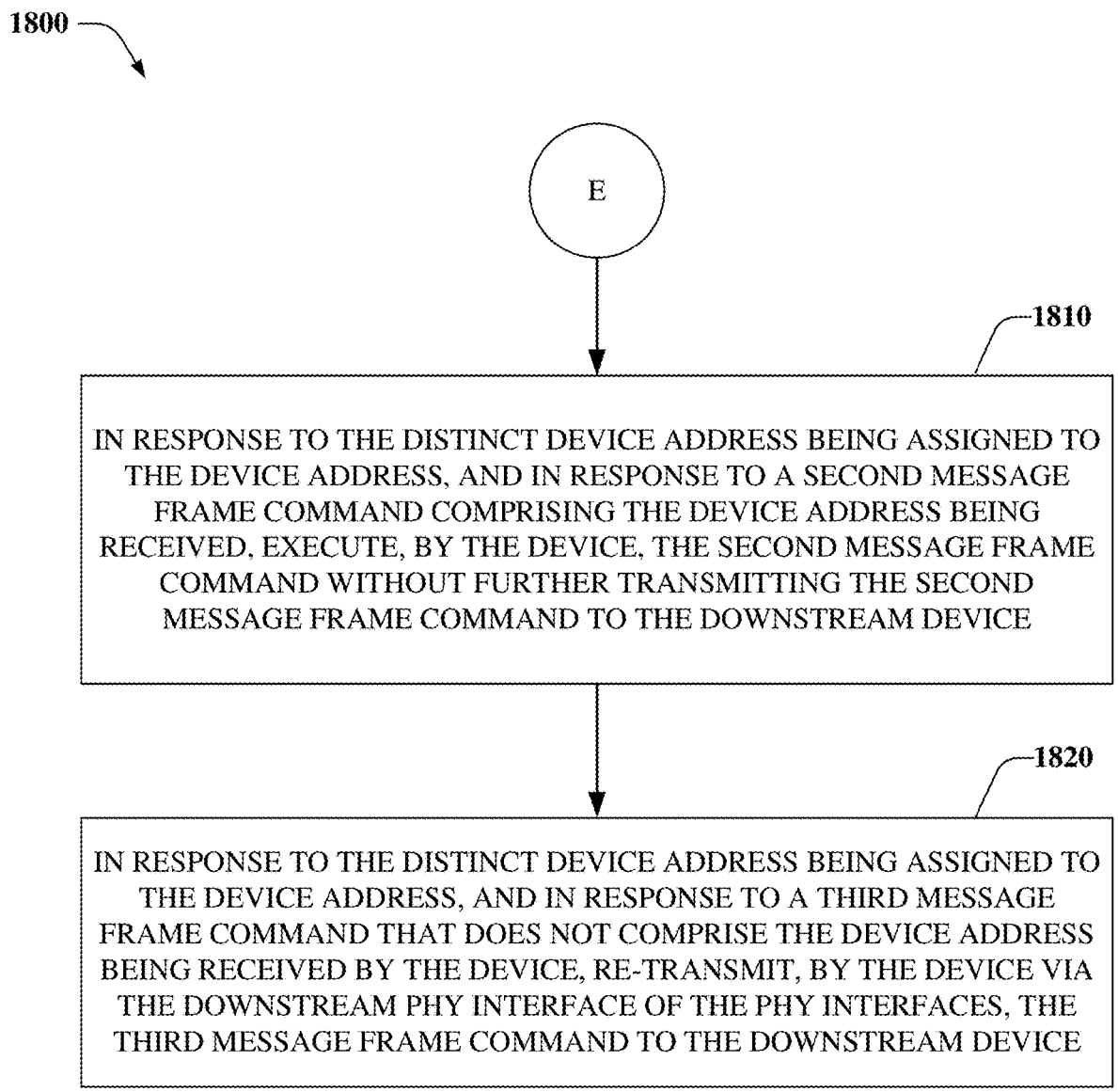

FIGS. 16-18 illustrate flowcharts (1600-1800) of a method associated with a device of a dynamically addressable daisy-chained group of devices having configurable physical layer interfaces, in accordance with various example embodiments. At 1610, in response to a device of a series of devices that are communicatively coupled to respective adjacent devices of the series of devices in a daisy-chain manner being powered up, the device determines a communication protocol configuration of a group of available communication protocol configurations of a PHY interface of PHY interfaces of the device based on voltage levels that have been applied to the PHY interface—the group of available communication protocol configurations comprising an LVDS based PHY configuration, a CAN based PHY configuration, and/or a single-ended serial communication PHY configuration comprising CMOS based logic or TTL based logic.

At 1620, the device detects an impedance state of the PHY interface and/or a logic state of the PHY interface. At 1630, the device determines, based on the impedance state and/or the logic state, whether the PHY interface is operable with respect to the available communication protocol configurations.

At 1710, in response to receiving, by the device via an upstream PHY interface of the PHY interfaces of the device, an initial message frame command comprising an initialization command that designates a distinct device address to be assigned to a device address of the device, the device assigns the distinct device address to the device address of the device, increments the distinct device address to obtain a downstream device address, generates a message frame command comprising a generated initialization command comprising the downstream device address, and sends, via a downstream PHY interface of the PHY interfaces of the device communicatively coupling the device to a downstream device of the group of devices that is immediately downstream of the device, the generated initialization command to the downstream device.

At 1810, in response to the distinct device address being assigned to the device address, and in response to a second message frame command comprising the device address being received, the device executes the second message frame command without further transmitting the second message frame command to the downstream device.

At 1820, in response to the distinct device address being assigned to the device address, and in response to a third message frame command that does not comprise the device address being received by the device, the device re-transmits, via the downstream PHY interface of the PHY interfaces, the third message frame command to the downstream device.

As it employed in the subject specification, the terms "component" and "logic" refers to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the terms MCU, "processing device", "controller", "microcontroller", and "processing component" can refer to substantially any computing processing unit or device, comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "register", "registers", and substantially any other information storage component relevant to operation and functionality of a system (e.g., 100, 200, 300) and/or devices disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a group of devices communicatively coupled with respective devices of the group of devices in a daisy-chained manner via physical layer (PHY) interfaces of the respective devices, wherein the PHY interfaces correspond to a group of available communication protocol configurations comprising at least one of a low voltage differential signaling (LVDS) based PHY configuration, a controller area network (CAN) based PHY configuration, or a single-ended serial communication PHY configuration comprising a complementary metal-oxide-semiconductor (CMOS) based interface or a transistor-transistor logic (TTL) based interface; and
    a host device that is directly connected, using a single-ended Manchester encoded serial communication interface, to a foremost device of the group of devices, wherein the host device is communicatively coupled, via the foremost device, to successive devices of the respective devices in the daisy-chained manner using the single-ended Manchester encoded serial communication interface.

2. The system of claim 1, wherein the single-ended Manchester encoded communication interface comprises a bi-directional half-duplex communication interface.

3. The system of claim 1, wherein each device of the group of devices comprises:
    an interface detection component that determines a communication protocol configuration of the group of available communication protocol configurations of a PHY interface of the PHY interfaces corresponding to the device based on voltage levels that have been applied to the PHY interface corresponding to the device.

4. The system of claim 1, wherein each device of the group of devices comprises:
    a physical path diagnostic component that
        detects at least one of an impedance state of a PHY interface of the PHY interfaces corresponding to the device or a logic state of the PHY interface corresponding to the device, and
        based on at least one of the impedance state or the logic state, determines whether the PHY interface corresponding to the device is operable with respect to the available communication protocol configurations.

5. The system of claim 4, wherein the physical path diagnostic component of the device:
  in response a determination, based on at least one of the impedance state or the logic state of the PHY interface corresponding to the device, that the PHY interface is inoperable with respect to a differential communication protocol configuration of the group of available communication protocol configurations, reconfigures the PHY interface corresponding to the device according to the single-ended communication protocol configuration of the group of available communication protocol configurations.

6. The system of claim 4, wherein the physical path diagnostic component of the device:
  in response to a determination, based on at least one of the impedance state or the logic state of the PHY interface corresponding to the device, that the PHY interface is inoperable with respect to the available communication protocol configurations,
    terminates downstream transmissions, and
    sends an error status directed to the host device.

7. The system of claim 1, wherein the host device communicates with each device of the group of devices by sending, via the single-ended Manchester encoded communication interface, a message frame command comprising a distinct device address corresponding to the device, a global address corresponding to all devices of the group of devices, or a group address corresponding to a portion of the group of devices.

8. The system of claim 1, wherein each device of the group of devices comprises:
  a command decoder component that
    in response to receiving a message frame command that has been determined to be an initial command, and
    in response to the initial command being determined to be an initialization command that facilitates an assignment of a distinct device address to the device, assigns the distinct device address to an assigned address of the device.

9. The system of claim 8, wherein the message frame command is a first message frame command, wherein the initialization command is a first initialization command, and wherein the command decoder component:
  in response to the distinct device address being assigned to the assigned address of the device,
    increments the distinct device address to obtain a downstream distinct device address,
    generates a second message frame command comprising a second initialization command comprising the downstream distinct device address, and
    sends, via a PHY interface of the PHY interfaces communicatively coupling the device to a downstream device of the successive devices that is immediately downstream of the device, the second message frame command comprising the second initialization command to the downstream device to facilitate an assignment of the downstream distinct device address to the downstream device.

10. The system of claim 8, wherein the command decoder component:
  in response to the message frame command being determined not to be the initialization command, and in response to the distinct device address being determined to be equal to the assigned address of the device, executes the message frame command and does not transmit the message frame command to a downstream device of the successive devices that is immediately downstream of the device; and
  in response to the message frame command being determined not to be the initialization command, and in response to the distinct device address being determined not to be equal to the assigned address of the device, re-transmits, via a PHY interface of the PHY interfaces communicatively coupling the device to a downstream device of the successive devices that is immediately downstream of the device, the message frame command to the downstream device.

11. The system of claim 7, wherein the host device further comprises:
  a message payload component that
    determines an amount of bytes to be transferred via the message frame command, and
    includes the amount of bytes in a payload size field of the message frame command to facilitate a determination, by the device, of a total message frame length of the message frame command.

12. A device, comprising:
  a physical layer interface (PHY) component comprising a pair of PHY interfaces that facilitate communication with respective devices of a group of devices that are communicatively coupled in a daisy-chained manner, wherein the group of devices comprises the device, and wherein the PHY interfaces correspond to a group of available communication protocol configurations comprising at least one of a low voltage differential signaling (LVDS) based PHY configuration, a controller area network (CAN) based PHY configuration, or a single-ended serial communication PHY configuration comprising a complementary metal-oxide-semiconductor (CMOS) based interface or a transistor-transistor logic (TTL) based interface; and
  a command decoder component that
    in response to the device being powered up, receives an initial message frame command comprising an initialization command that designates a distinct device address to be assigned to a device address of the device, and
    assigns the distinct device address to the device address to facilitate receiving, based on the device address, other message frame commands from a host device that is communicatively coupled to the group of devices via a foremost device of the group of devices using a single-ended Manchester encoded serial communication interface.

13. The device of claim 12, wherein the initialization command is a first initialization command, and wherein the command decoder component:
  in response to the distinct device address being assigned to the device address of the device,
    increments the distinct device address to obtain a downstream device address,
    generates a message frame command comprising a second initialization command comprising the downstream device address, and
    sends, via a PHY interface of the pair of PHY interfaces communicatively coupling the device to a downstream device of the group of devices that is immediately downstream of the device, the message frame command comprising the second initialization command to the downstream device to facilitate an assignment of the downstream device address to the downstream device.

14. The device of claim 13, wherein the command decoder component:
  in response to the distinct device address being assigned to the device address, and in response to a message frame command comprising the device address being received, executes the message frame command and does not transmit the message frame to the downstream device.

15. The device of claim 12, wherein the command decoder component:
  in response to the distinct device address being assigned to the device address, and in response to a message frame command that does not comprise the device address being received, re-transmits, via the PHY interface of the pair of PHY interfaces, the message frame command to the downstream devices.

16. The device of claim 12, further comprising:
  an interface detection component that determines a communication protocol configuration of the group of available communication protocol configurations of a PHY interface of the pair of PHY interfaces based on voltage levels that have been applied to the PHY interface.

17. The device of claim 16, further comprising:
  a physical path diagnostic component that
    detects at least one of an impedance state of the PHY interface or a logic state of the PHY interface, and
    based on at least one of the impedance state or the logic state, determines whether the PHY interface is operable with respect to the available communication protocol configurations.

18. A method, comprising:
  in response to a device of a series of devices that are communicatively coupled to respective adjacent devices of the series of devices in a daisy-chain manner being powered up, determining, by the device, a communication protocol configuration of a group of available communication protocol configurations of a PHY interface of PHY interfaces of the device based on voltage levels that have been applied to the PHY interface, wherein the group of available communication protocol configurations comprises at least one of a low voltage differential signaling (LVDS) based PHY configuration, a controller area network (CAN) based PHY configuration, or a single-ended serial communication PHY configuration comprising complementary metal-oxide-semiconductor (CMOS) based logic or transistor-transistor logic (TTL) based logic;
  detecting, by the device, at least one of an impedance state of the PHY interface or a logic state of the PHY interface; and
  based on at least one of the impedance state or the logic state, determining, by the device, whether the PHY interface is operable with respect to the available communication protocol configurations.

19. The method of claim 18, further comprising:
  in response to receiving, by the device via an upstream PHY interface of the PHY interfaces of the device, an initial message frame command comprising an initialization command that designates a distinct device address to be assigned to a device address of the device,
    assigning, by the device, the distinct device address to the device address of the device,
    incrementing, by the device, the distinct device address to obtain a downstream device address,
    generating, by the device, a message frame command comprising a generated initialization command comprising the downstream device address, and
    sending, by the device via a downstream PHY interface of the PHY interfaces of the device communicatively coupling the device to a downstream device of the group of devices that is immediately downstream of the device, the generated initialization command to the downstream device.

20. The method of claim 19, wherein the message frame command is a first message frame command, and further comprising:
  in response to the distinct device address being assigned to the device address, and in response to a second message frame command comprising the device address being received, executing, by the device, the second message frame command without further transmitting the second message frame command to the downstream device; and
  in response to the distinct device address being assigned to the device address, and in response to a third message frame command that does not comprise the device address being received by the device, re-transmitting, by the device via the downstream PHY interface of the PHY interfaces, the third message frame command to the downstream device.

* * * * *